United States Patent [19]
Arvanitakis

[11] 4,192,746
[45] Mar. 11, 1980

[54] LIQUID CLARIFICATION SYSTEM

[76] Inventor: Kostas S. Arvanitakis, 14945 S. Dogwood Ave., Orland Park, Ill. 60462

[21] Appl. No.: 909,162

[22] Filed: May 24, 1978

[51] Int. Cl.² ............... B01D 21/06; B01D 33/26; B01D 37/02

[52] U.S. Cl. ............... 210/73 S; 210/75; 210/77; 210/79; 210/97; 210/193; 210/259; 210/296; 210/297; 210/298

[58] Field of Search ............ 210/521, 522, 73 R, 210/73 S, 65, 66, 67, 74, 75, 77, 83, 294, 295, 296, 297, 359, 324, 330, 331, 79, 97, 113, 193, 252, 259, 260, 261, 298

[56] References Cited

U.S. PATENT DOCUMENTS

| | | | |
|---|---|---|---|
| 1,030,271 | 6/1912 | Arbuckle | 210/521 |
| 2,821,306 | 1/1958 | Davila | 210/294 |
| 4,001,115 | 1/1977 | Arvanitakis | 210/73 R |

Primary Examiner—Frank Sever
Attorney, Agent, or Firm—August E. Roehrig, Jr.

[57] ABSTRACT

A liquid clarification system for separating solid and/or chemical contaminants from an unclarified liquid wherein a variable influent is passed through a settling clarifier to separate a portion of the contaminants from the liquid forming a semi-solid sludge. The sludge is passed into a reservoir and delivered to a filtration system at a controlled predetermined percentage of solids material. The solids material is circulated through the filtration system to form a filter cake on the septum of filters carried in a filtration chamber and the liquid is clarified by passing through the filter cake formed thereon. Periodically when the filter cake must be reformed, the expended cake is removed from the septum and conveyed from the filtration chamber through a sludge drying system to be discharged as dry solids waste material.

10 Claims, 11 Drawing Figures

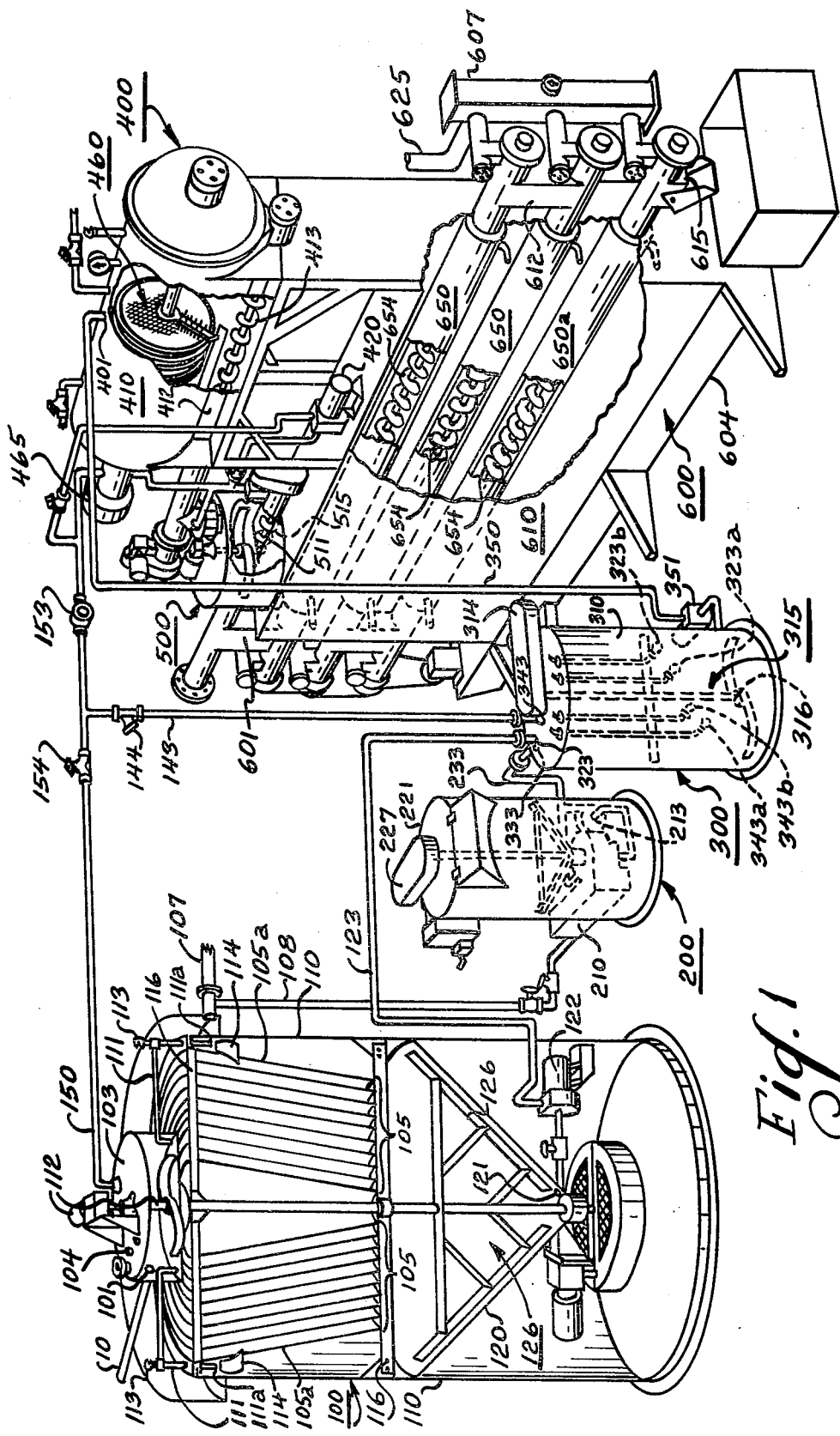

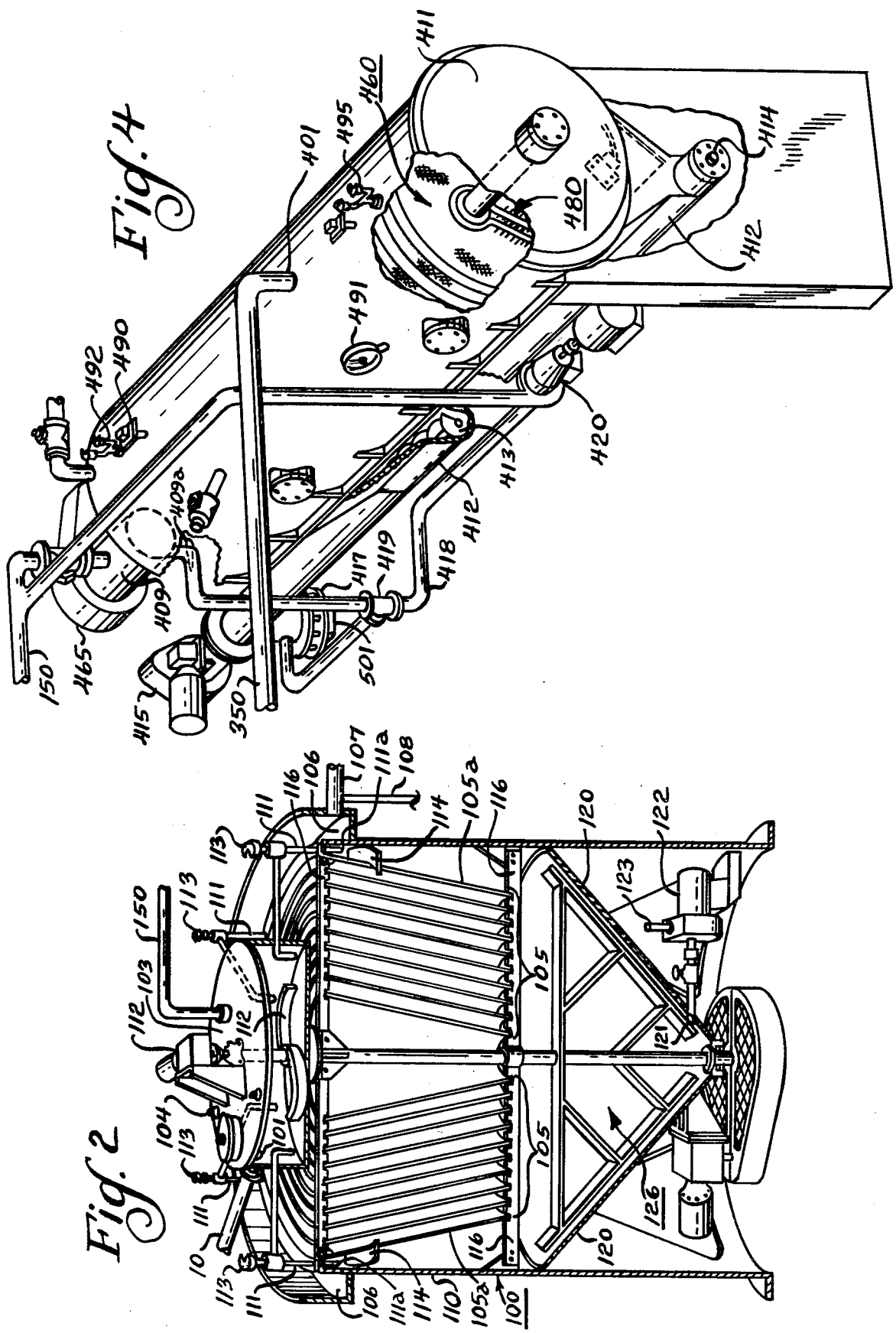

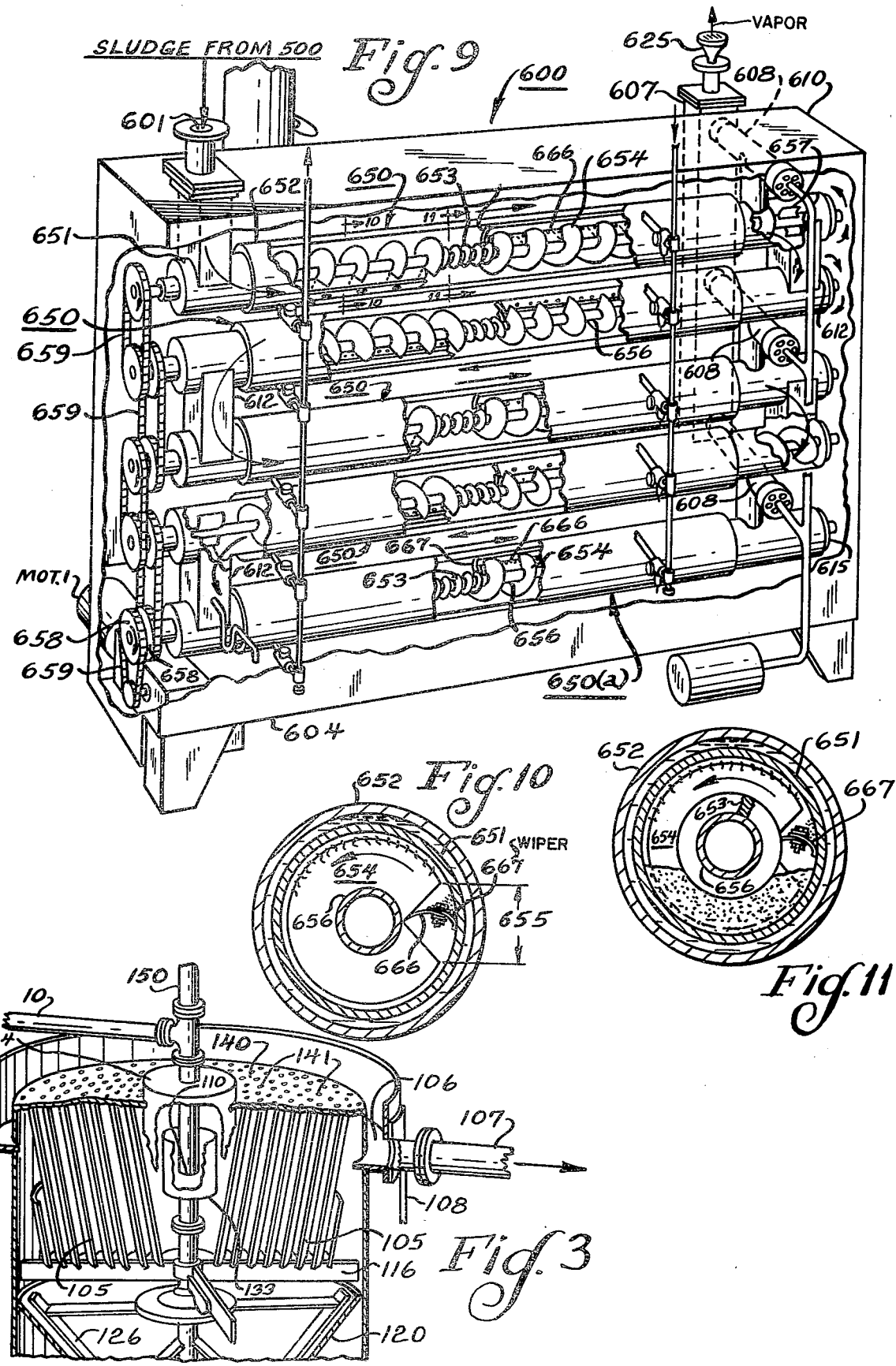

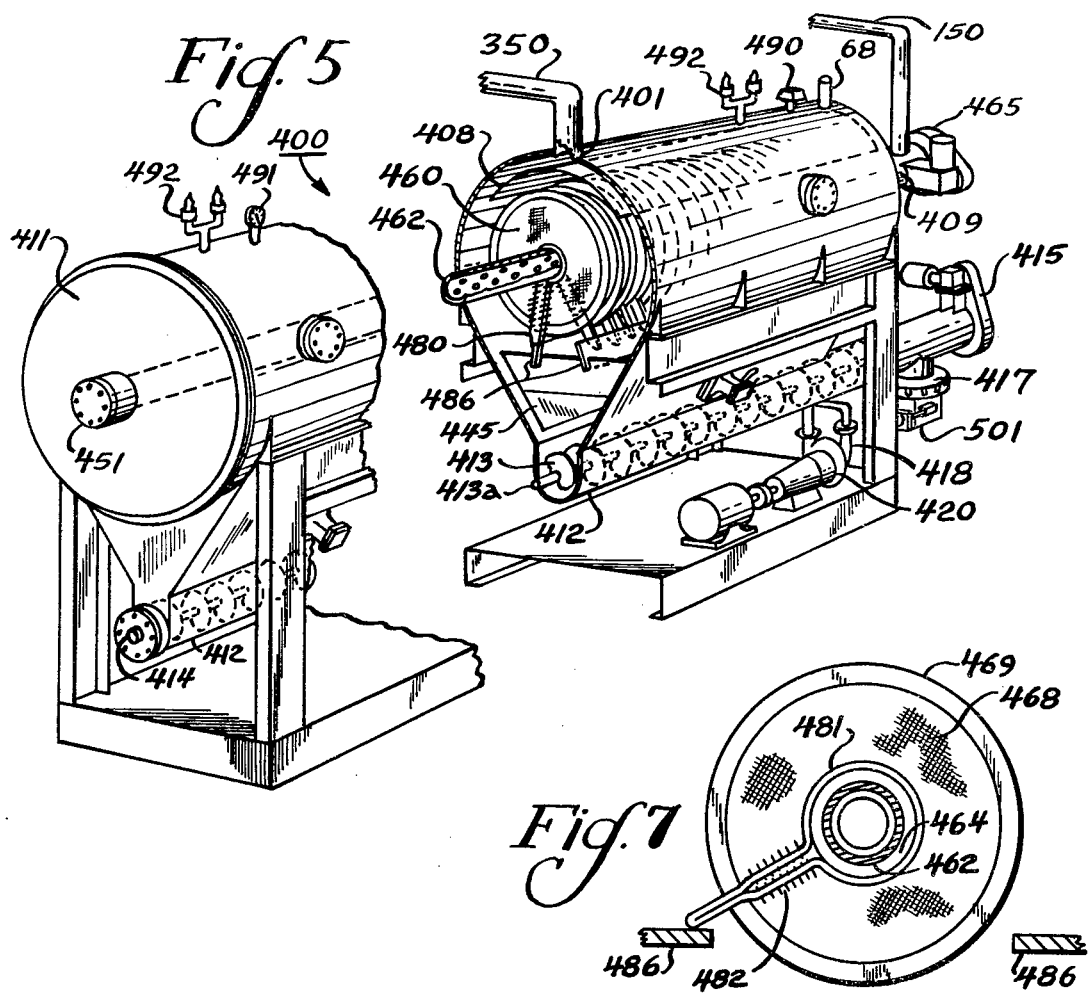
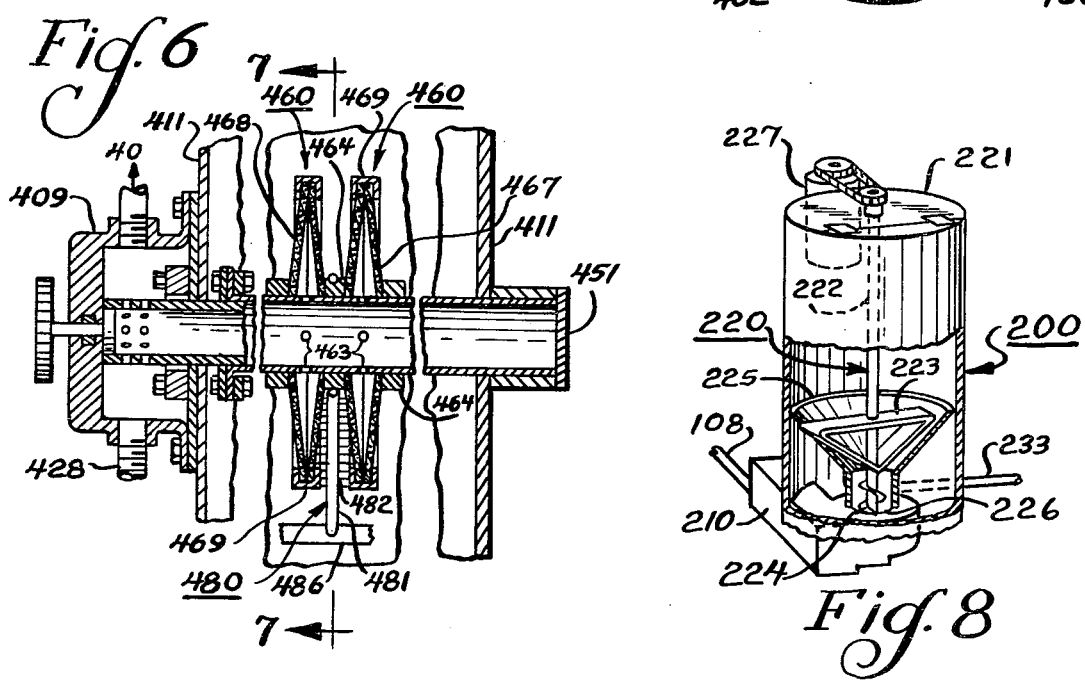

LIQUID CLARIFICATION SYSTEM

BACKGROUND OF THE INVENTION

This invention relates in general to an improved method and apparatus for liquid/solids separation and, in particular, to a liquid/solids separation system which separates solids material from an unclarified liquid in part by settling. The materials which settle from the unclarified liquid and a portion of the liquid are further processed to separate the remaining solids from the liquid to discharge dry solids material from the system.

More specifically, this invention relates to a liquid/solids separation system utilizing a settling clarifier to remove solids material suspended in a liquid through the introduction of chemicals and inert solids material to accelerate the settling rate or precipitation of the solids material from the liquid. The effluent discharged therefrom may be further processed, discharged, or recycled depending upon the nature of the effluent. The semi-solids material which is settled or precipitated from the unclarified liquid, referred to as sludge, is passed to a storage reservoir whereat this material is further processed in order to obtain predetermined uniform quantity of solids material in the sludge. The material from the storage reservoir is then discharged into a filtration system whereat the solids materials contained therein are utilized to form a filter cake on the septum of the system filters with the filtrate from the filtration system being discharged from the filter for further processing, disposal or reuse depending upon the nature of the liquid. The solids material is accumulated by the filters and periodically removed therefrom to be conveyed through a sludge drying system whereat the solids materials are further treated and discharged as dry waste material.

The many applications wherein it is desired to clarify liquids by removing solid material and/or chemical contaminants prior to discharging the liquid are of such varied nature that sequential processing steps must be employed in order to clarify the liquid and/or remove the solids materials. Depending upon the nature of the liquid, some such systems are utilized to clarify the liquid prior to discharge, for example, into sewers. With other types of contaminated liquids, the liquid is clarified for continuous use because the liquid cannot be discharged into sewer lines and/or the costs of the liquid or costs of liquid disposal render discharge economically unduly prohibitive.

In all liquid/solid separation systems, the most desirable manner for disposing of the solids materials removed by the system would be to dispose of these solids material in a dry form. The discharge of dry waste solids materials from the system provides for more economic operation. Dry solids materials may be readily disposed of and/or more easily handled for further processing depending upon the nature of the solids material and whether or not it is desirable to dispose of these materials or to subject them to further processing.

Due to the highly varied nature of the contaminated liquids, the amount of liquid discharged (flow rate) as well as the amount of solids materials contained in the liquid (percentage of solids), or both, may vary extensively. Any liquid/solids separation systems which are intended to receive unclarified liquid, clarifying the liquid and discharging the solids material as a dry waste discharge, must, therefore, be capable of handling a wide latitude of flow rates and percentages of solids material passing through the system.

SUMMARY OF THE INVENTION

It is, therefore, an object of this invention to improve liquid/solids separation systems.

Another object of this invention is to improve liquid/solids separation systems by accelerating the rate of settling solids material from the liquid in order to more uniformly control the percentage of solids material for processing.

Yet another object of this invention is to maintain a more uniform discharge of unclarified liquid effluent for separation of the solids material therefrom.

Still another object of this invention is to accumulate the solids material contaminants from the unclarified liquid for efficient removal from the liquid/solids separation system.

Yet a further object of this invention is to process solids material removed from an unclarified liquid for disposal as a dry waste discharge.

These and other objects are attained in accordance with the present invention wherein there is provided a liquid clarification system for separating solid and/or chemical contaminants from an unclarified liquid wherein a variable influent is passed through a settling clarifier to separate a portion of the contaminants from the liquid forming a semi-solid sludge. The sludge is passed into a reservoir and delivered to a filtration system at a controlled predetermined percentage of solids material. The solids material is circulated through the filtration system to form a filter cake on the septum of filters carried in a filtration chamber and the liquid is clarified by passing through the filter cake formed thereon. Periodically when the filter cake must be reformed, the expended cake is removed from the septum and conveyed from the filtration chamber through a sludge drying system to be discharged as dry solids waste material.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a perspective view of the invention to better illustrate the components of the system;

FIG. 2 is a frontal perspective view of one embodiment of a settling clarifier utilized in the invention with portions removed to better illustrate the manner in which suspended solids materials are collected and gravitationally settled from the contaminated liquid;

FIG. 3 is a front perspective view of a portion of another embodiment of a settling clarifier which may be utilized in the invention, with portions removed to illustrate the internal parts thereof;

FIGS. 4 and 5 are perspective views with portions broken away of a filtration chamber containing filter assemblies therein for clarifying liquid passed therethrough;

FIG. 6 is an enlarged view of a portion of the filtration chamber shown in FIGS. 4 and 5 to better illustrate the filter assemblies;

FIG. 7 is a sectional view of the apparatus of FIG. 6 taken along lines 7—7;

FIG. 8 is a frontal perspective view, with portions removed, of a body feeder utilized in the invention to better illustrate the manner in which materials may be added to the unclarified liquid;

FIG. 9 is a frontal perspective view of a sludge drying system utilized in the invention to dry the solids material removed from the filtration chamber; and FIGS. 10 and 11 are enlarged views of a portion of the feed auger used to convey the solids material through the sludge drying system to be discharged as a dry solid waste material.

DESCRIPTION OF THE PREFERRED EMBODIMENT OF THE INVENTION

Referring now to the invention as shown in FIG. 1, there is illustrated various components identified generally as a clarifier 100, a body feeder 200, a storage dilution reservoir 300, a vertical leaf filter 400, a sludge storage reservoir 500, and a sludge dryer 600, all of which will be hereinafter described in detail.

In treating the unclarified liquid, unclarified influent is pumped or fed by gravity to the clarifier 100, through an inlet pipe 10, into the clarifier 100. The influent is continuously passed into the clarifier 100 through an inlet 101 into a closed pre-mix tank 103, which is supported above the uppermost portions of a plurality of frusto-conic sections 105, to be described in detail hereinafter. The pre-mix tank 103 is entirely closed, but is in fluid communication with the interior of clarifier chamber 110 through a plurality of influent distributors 111 spaced equidistantly about the periphery of the uppermost end of the chamber 110. The influent distributors 111 are formed as a hollow tube extending from within the pre-mix tank 103 to a discharge point 111a within the clarifier chamber 110 which is below the level of the tube within the pre-mix tank 103. Ports 104 are provided in the pre-mix tank 103 for the addition of chemicals or other additives as desired depending upon the nature of the influent and the desired effluent or solids material to be discharged. A mixer and drive system 112 are carried on the pre-mix tank 103 to stir and agitate the contents in order to mix the influent with any chemical reagents added into the pre-mix tank 103 and to prevent the solids material from settling in the pre-mix tank prior to passing into the clarifier chamber 110 through the influent distributors 111.

In order to prevent turbulence in the clarifier chamber 110, the influent from discharge pipe 10 is discharged into the pre-mix tank 103. The unclarified liquid in the pre-mix tank 103 is then passed into the clarifier chamber 110 by means of the influent distributors 111 which extend from the pre-mix tank 103 which is carried above the uppermost portion of the frusto-conic sections 105 to a point beneath the liquid level of the clarifier chamber 110 to form a fluid coupling therebetween. The discharge outlet 111a of the influent distributors 111 is positioned adjacent the outer periphery of the clarifier chamber 110 to discharge the influent against a turbulence-suppressing baffle plate 114 secured in a position between the inner walls of the clarifier chamber 110 and the backside of the outermost outwardly diverging frusto-conic section 105a. In this manner the influent discharge first passes into the pre-mix tank 103 which reduces the turbulence, and then is passed into the clarifier chamber 110 through the influent distributors 111 which discharge the influent beneath the level of liquid contained in the chamber 110 onto turbulence-suppressing baffles 114 carried behind the active surfaces of the frusto-conic sections 105. Each of the influent distributors 111 has an anti-siphon vacuum breaker 113 to prevent influent flow variations from effecting a siphon action.

The series of upwardly diverging frusto-conic sections 105 are carried within the clarifier 110 by a plurality of spiders 116 supported from the inner walls of the clarifier chamber 110 and positioned to diverge upwardly toward the top of the clarifier chamber. The lower ends of the frusto-conic sections 105 are open so that the liquid which flows out of the discharge outlet 111a of the influent distributors 111 against the turbulence-suppressing baffle plate 114 will rise uniformly upwardly between the concentric frusto-conic sections 105 so that the sludge, which accumulates in a bottom frusto-conic section 120 in a manner to be hereinafter described in detail, will not be disturbed. The liquid that rises above the tops of the frusto-conic sections 105 passes into a trough 106 supported at the top of clarifier chamber 110. The clarifier effluent from trough 106 passes through discharge line 107 for further processing or reuse or a portion is by-passed through line 108 which is in fluid communication with the body feeder 200, for a purpose to be hereinafter described in detail.

As the liquid rises between the frusto-conic sections 105 to fill the clarifier chamber 110, the solids material will gravitationally settle from the liquid. Due to the outward divergence of the frusto-conic sections 105 in an upward direction, as this solids material settles it will quickly contact the surfaces of the frusto-conic sections causing agglomeration of the solids material. The agglomeration of the sludge will increase the speed in which the solids material settles from the liquid and the amount of solids material that is removed. As the solids material on the inner surfaces of the frusto-conic sections 105 increases, due to the material agglomeration, the solids become more dense and slide off the inner surfaces into the bottom conically-shaped section 120 of the clarifier chamber 110 where they accumulate. In some applications wherein the solids materials have a tendency to pack on the inner surfaces of the concentric frusto-conic sections 105 a vibration system (not shown) is employed so that the frusto-conic sections 105 are shaken to prevent any buildup of solids material and to insure that the solids material will be removed to settle onto the clarifier chamber bottom 120.

As the suspended solids material settles from the contaminated liquid onto the concentric frusto-conic sections 105, the material agglomerates and slides from the frusto-conic sections into the conical section bottom 120 of the clarifier chamber 110. At intervals, depending upon the quantity of solids material in the contaminated liquid, a motor driven cone scraper 126 is activated to rotate within the cone bottom 120.

When the cone scraper 126 is activated, the cone scraper slowly rotates (approximately ½ to 1 RPM) scraping the inner peripheral surface of the cone-shaped clarifier bottom 120. The scraping action prevents any sludge buildup and feeds the accumulated sludge to a discharge port 121, formed near the apex of the cone 120, through which the accumulated sludge is periodically removed by means of a discharge pump 122. The sludge material is withdrawn from near the apex of cone 120 by means of the discharge pump 122 and passed through a discharge line 123 to the sludge dilution reservoir 300.

While the clarifier shown in FIGS. 1 and 2 is especially useful for applications which have heavy concentrations of solids material and slow flow rates, an alternative form of clarifier may be utilized when the concentration of solids material is lighter and the flow rate of the unclarified influent is greater. Such a clarifier is illustrated in FIG. 3, wherein like reference numerals indicate parts corresponding to those of the clarifier disclosed with reference to FIGS. 1 and 2.

In the embodiment disclosed in FIG. 3, a series of concentric frusto-conic sections 105 are positioned in the clarifier chamber 110 in the manner previously disclosed. The unclarified influent is discharged through the influent line 10 into a turbulence suppressor cup 133 positioned adjacent the inlet 110 to fill the clarifier chamber 110. The turbulence suppressor cup 133 is partially surrounded by a larger concentric cup-shaped hood 134 supported from the influent discharge pipe 10. When the liquid is delivered into the clarifier 100, it is discharged into the turbulence suppressor cup 133 which is partially surrounded by the suppression hood 134 to minimize delivery turbulence.

A flow-control plate 140 which is secured to the upper ends of the frusto-conic sections 105 and the clarifier chamber 110 closes the upper ends of the sections 105 except for a plurality of apertures 141 formed in the plate 140. The flow control plate 140 encloses the upper surface of the clarifier chamber 110. The series of apertures 141, formed therein, are of a size to create a back pressure on liquid passing therethrough which increases the settling rate of the suspended solids and to insure uniformity of upward flow-rate distribution between each of the frusto-conic sections 105.

As the liquid rises between the frusto-conic sections 105 to fill the clarifier chamber 110, the solids material will gravitationally settle from the liquid in the manner previously described, and when the liquid passes out through the apertures 141 in the flow-control plate 140, it will flow into a trough 106 and out a discharge outlet 107 or by-pass line 108 for disposal or further treatment.

For further detail concerning the structure of the clarifier 100 and alternative configurations of the clarifier chamber bottom for various influent applications, reference is had to K. S. Arvanitakis Application Ser. No. 838,753, filed Oct. 3, 1977, "METHOD & APPARATUS FOR CLARIFYING LIQUIDS THROUGH SETTLING", the disclosure of which is hereby incorporated by reference.

While the sludge material is removed from the bottom of the cone 120 of the clarifier chamber, the liquid which overflows the top of the frusto-conic sections 105 into the trough 106 is directed out of the clarifier through discharge line 107 or through line 108. The portion of the liquid passing through line 108 is delivered into the body feeder 200 to be mixed and form a slurry with filter precoat material or chemicals for effecting precipitation or agglomeration of certain materials which are dissolved in the liquid. This slurry is thereafter pumped to the sludge dilution reservoir 300 through a body feeder discharge line 233.

The body feeder 200, illustrated in FIGS. 1 and 8, includes a filter aid or materials feeder 220 comprising a hopper 221 having a shaft 222 extending longitudinally within the feed hopper and having secured thereto an agitator 223 and feed auger 224. The bottom of the hopper 225 is formed in a conical shape and secured within the hopper chamber 221 to prevent any of the precoat or filter aid material contained therein from being discharged except through an outlet 226 in the bottom of the cone. The shaft 222 is suitably journalled in bearing surfaces and brackets secured to the walls of the filter aid hopper 221 on the bottom and in the top of the hopper for rotation by means of a body feeder drive motor 227 mechanically connected to the shaft 222 such that upon energization of the body feeder drive motor 227, the shaft 222, agitator 223, and feed auger 224 will rotate. Due to the variable speed gearing of the feed auger 224 a controlled premeasured amount of filter forming material or media contained in the hopper 221 is added into a precoat tank 210. The precoat tank 210, into which the clarifier effluent passes through line 108, is used to form a slurry of the clarifier effluent and the materials in the hopper chamber 221. This slurry is pumped by the body feeder pump 213 through the discharge line 233 to the sludge dilution reservoir 300. For further reference to the details of a suitable body feeder, reference is had to K. S. Arvanitakis, U.S. Pat. No. 3,705,648.

The body feeder 200 is used to provide filter cake forming materials for use in the formation of a suitable precoat on the septum of the vertical leaf filters of the filter 400 (to be described in detail hereinafter). After a suitable filter cake has been formed on the filter septum, the body feeder 200 continues to operate to supply filter cake forming materials and/or chemical reagents to the sludge mixture in the sludge dilution reservoir 300 in order to maintain a more porous filter cake on the filter septum of the filter 400 during filtration operation.

The sludge dilution reservoir 300 comprises a closed tank 310 having a motor driven stirring mechanism 315 carried within such that operation of a motor 314 will rotate a shaft 316 to stir the contents of the tank 310 to prevent solids material from settling therein. The container or chamber 310 has three inlets 323, 333, and 343.

Discharge inlet 323 is in fluid communication with the output line 123 of the discharge pump 122 which withdraws sludge material from the cone bottom 120 of the clarifier 100 and forwards this material into the tank 310 of the sludge dilution reservoir 300. Inlet 333 is in fluid communication with the mixing chamber 210 of the body feeder 200 to receive the contents thereof into the tank 310. Discharge inlet 343 is coupled in fluid communication with the filtrate discharge line from the filter 400 to be hereinafter described in detail.

A plurality of level controllers 323a and 323b, and 343a and 343b are carried within the tank 310. These controllers, which are of any suitable commercially available type, provide an output signal responsive to the level of the mixture in the tank 310.

The controllers 323a and 323b function to control operation of the clarifier discharge pump 122 in order to maintain a predetermined quantity of sludge in the tank 310. When the level of sludge in the tank 310 decreases below level controller 323a, the discharge pump 122 is activated withdrawing sludge from the cone bottom 120 of the clarifier 100 and passing it through the discharge pump 122, discharge line 123, into the tank 310 through the discharge inlet 323. At such time as the level of the mixture in the tank increases to the level of controller 323b, the operation of the sludge discharge pump 122 is terminated.

Controllers 343a and 343b control the addition of filtrate, discharged from the filter unit 400, into the tank 310. The filtrate discharged from filter 400 passes through a discharge line 150 to be discharged into the clarifier 100 or through line 143 to be discharged into the tank 310 through the filtrate discharge inlet 343 in response to electrical solenoid controlled valves 154 and 144 carried, respectively, in each line. In operation when the level of the contents in tank 310 falls beneath level controller 343a, the level controller will close valve 154 and open valve 144 carried in the filtrate discharge line 150 and the line 143, respectively. Filtrate from the filter 400 will be discharged into tank 310 and when the level of the contents increases to the level of controller 343b, valve 154 will open and valve 144 will close. The filtrate from the filter 400 will then discharge into the clarifier 100 and filtrate flow through line 143 will stop.

In this manner, during initial operation of the system if the materials from the sludge dilution reservoir 300 are passed through the filter 400 at a greater rate than sludge is being supplied by discharge pump 122, the controllers 343a and 343b will pass filtrate from the filter 400 into the sludge dilution reservoir 300. This filtrate will dilute the percentage of solids material in the sludge and pass the materials to the filter maintaining a desired percentage of solids material in the mixture as well as a predetermined flow rate of material to the filter.

As the operation of the filter 400 continues, and the flow rate of material through the filter is equal to the rate of sludge being supplied by the discharge pump 122, the controllers 343a and 343b will terminate the flow of filtrate into the tank 310. The discharge pump 122 will continue to operate discharging sludge from the clarifier 100 into the tank 310. At such time as the solids material has accumulated on the elements of the filter, and the flow through the filter is less than the quantity of material being supplied by the discharge pump 122, the controller 323b will terminate operation of the discharge pump 122. Such termination will occur, for example, during removal of the expended filter cake from the filter elements to insure that the sludge material does not overflow the storage tank 310. For further details concerning the operation of such a storage and dilution reservoir system, reference is had to K. S. Arvanitakis, U.S. Pat. No. 4,001,115, "FILTRATION SYSTEM WITH STORAGE AND DILUTION RESERVOIRS," the disclosure of which is herein incorporated by reference.

The sludge material mixture in the sludge dilution reservoir 300 is pumped through a discharge line 350 by a discharge pump 351, into the inlet 401 of a filter chamber 410 of the vertical leaf filter 400. The vertical leaf filter 400 includes the filter chamber 410 enclosed at both ends by covers 411, which are removably sealed to facilitate servicing of the internal mechanisms such as replacing worn parts. A trough 412 is formed in the bottom of the filter chamber 410 and through suitable journals support a rotatably driven discharge auger 413 in appropriate bearings 414. A discharge auger drive motor 415, when activated, rotates the discharge auger 413 to forward solids material falling into the trough 412 to a discharge outlet 417 whereat impellers 416 secured to the auger shaft 413a compress the solids materials within a pneumatically controlled butterfly valve 501 which is periodically opened to discharge solids material from the system through a discharge outlet. Any liquid removed by the compressing action passes through a filter chamber drain conduit 418 (through which the contents of the filter chamber are drained) and a pneumatically controlled valve 419 to a filter drain pump 420.

Unclarified liquid containing the sludge material which is delivered into the filter chamber 410 through the inlet 401 from the sludge dilution reservoir discharge line 350 is passed through co-axial vertical filter elements 460 into a hollow filter tube 462 and out through the filter outlet 409 into filtrate discharge line 150 to be passed through pneumatically or electrically solenoid controlled valves 154 or 144 depending upon the opening or closing of such valves.

The filter elements 460 are mounted co-axially upon the filter tube 462 and separated by a plurality of spacers 464 such that perforations 463 formed in the filter tube 462 are in communication with the interior of the filter disc 460 as best shown in FIGS. 6 and 7. The hollow filter tube 462 is rotatably mounted in a suitable seal bearing 451 secured to one end of the filter chamber 410 and in another sealed bearing in the filter outlet housing 409 at the opposite end. The filter tube 462 is closed at both ends and has perforations 463 formed therein in communication with the interior of the filter elements 460 through which the clarified liquid passes to be discharged from the filter unit through filtrate discharge line 150.

Each filter element 460 comprises a support structure or spacer 467 covered with a fine mesh screen or septum 468. The support structure 467 supports the fine mesh screen or septum 468 in an outwardly tapering manner from the center of the element to the outer edge. The filter cloth or fine mesh screen or septum 468 covering the support structure is of a mesh size such that all solid particles suspended in the liquid of a size at least approximately 47 microns are retained on the screen when liquid is pumped through the filter element. However, the mesh size will be dependent upon the particle size of the filter aid material, or body feed, used and the particle size of the suspended contaminants. The outer periphery of each of the filter elements 460 has a metallic rim 469 fixed thereon that slightly overlaps the screen or septum and seals the outer periphery of each filter element 460.

A plurality of wipers 480 are positioned between the filter elements 460 to clean the outer surfaces thereof. The wipers 480 are each supported on a spacer 464 which separates the individual filter elements so that each wiper is in contact with the opposing face of two adjacent filter elements. A filter element drive motor 465 is operatively connected to filter tube 462 to rotate the tube. When the filter elements 460 are thereby rotated relative to the wipers 480 (to remove the expended filter cake and accumulants) the relative motion between the wipers 480 and the filter elements 460 will cause the entire surface of each filter element to be subjected to the wiping action.

Each of the wiper elements 480 includes an arm portion 481 to which brush fibers 482 are appropriately secured. The wiper arm 481 extends radially outward from the filter tube 462 and about the spacer element 464 to be supported thereby. A pair of stops 486 are appropriately secured to the internal walls of the filter chamber 410 to prevent the wipers from rotating when the filter tube 462 and the filter elements 460 are rotated. Therefore, the wipers 480 will remain stationary and the brush fibers 482 will mechanically scrub the entire surface of the filter elements 460 when the filter element drive motor 465 is actuated. It has been found that a speed of rotation such that the relative movement between the brush fibers 482 and the filter elements 460 should be no greater than 1,000 inches per minute and preferably between approximately 200 and 400 inches per minute to cause the filter cake to be removed from the filter septum 468.

Upon initial startup, the filter elements 460 do not have any filter cake formed on the filter septum 468. The materials from the sludge dilution reservoir 300 are pumped into the filter chamber 410 and passed through the filter septum 468 of the filter elements 460, through the discharge outlet 409 of the filter into discharge line 150. Valve 154 is closed and valve 144 open so that the filtrate recirculates back to the sludge dilution reservoir 300 to be recirculated thereby through the filter elements 460 until such time as the material in the tank 310 accumulates on the septum 468 to form a filter cake.

During operation of the system to form a filter cake on the filter septum 468 the body feeder 200 is in operation. The discharge pump 351 of the sludge dilution reservoir 300 is operating to forward the slurry from the mixing tank 210, which comprises effluent from the clarifier 100 which has been mixed with the solids materials from the body feeder hopper 221, which is discharged into the sludge dilution reservoir 300. When a sufficient amount of filter cake has been formed on the filter septum 468, the solids materials will accumulate thereon and a sight glass 153 will show a clear fluid flow at which time valve 154 is opened and valve 144 closed allowing the filtrate discharged from filter 400 to be discharged into the clarifier 100. The body feeder 200 thereafter continues operation during filtration in order to supply filter cake forming materials and/or chemical reagents to the sludge mixture to form a more porous filter cake on the filter septum to facilitate filtration operation.

After precoating has been completed and a filter cake formed on a septum, a sufficient pressure differential is maintained across the filter cake by the pumps in order to prevent the filter cake from slipping off the filter septum 468. When a predetermined amount of accumulants are entrained in or on the filter cake, the pressure differential thus created maintains the integrity of the filter cake. Filtration continues clarifying the liquid as it is passed through the filter elements 460 and the filtrate is discharged from the filter outlet 409 until such time as the pressure drop across the filter elements 460 rises to a level determined by pressure responsive switch 490 which is actuated in response to a predetermined pressure indicated on a gage 491. When such pressure is reached, the filtration system is interrupted in order to drain the contents from the filter chamber 410 through a drain 418, clean the expended filter cake and accumulants from the filter elements 460, and discharge the solids material from the filter chamber for processing the solids material to be discharged in the form of a dry waste solids material.

As the contaminant material is separated from the liquid and accumulants on the septum supported filter cake, these accumulants increase the pressure differential across the filter elements 460. At such time as the pressure differential reach a predetermined amount the filter cake must be removed from the filter elements 460 in order to continue efficient filtration of the influent. When this occurs the discharge pump 351 of the sludge dilution reservoir 300 is de-energized and the filter drain pump 420 is actuated to drain the liquid contents from the filter chamber 410. The liquid contents removed therefrom are pumped from the filter drain pump 420 back into the clarifier 100 through pump discharge line 421 which is in fluid communication with filtrate discharge line 150. The drain pump 420 is sized sufficiently to create a pressure differential to retain the expended filter cake on the filter septum 468 by withdrawing a portion of the liquid in the filter chamber 410 through the filter elements 460 and out from the filter outlet housing 409. Vacuum breakers 492 are provided on the filter chamber 410 to allow atmospheric pressure within the filter chamber to permit the rapid withdrawal of the contents. For applications wherein the filter cake is of a nature such that it tends to slip from the filter septum 468 during draining of the filter chamber 410, an ejector system 409a is connected into the drain line from the filter outlet 409 to create a greater pressure differential across the filter elements 460 during draining. The ejector system 409a may be compressed air or steam ejector, or a liquid ejector system such as by coupling the discharge from the filter pump 420 to the ejector or adding an additional pump to eject liquid removed from the filter chamber 410 back into the discharge line.

Liquid passing through the filter elements 460 into the filter outlet housing 409 is drained through the pneumatically controlled valve 419 carried in the filtrate drain line 418 and is passed into the pump 420. The liquid contained in the filter chamber 410 which is not passed through the filter elements 460 is drained through the drain line 418 which is in fluid communication with the trough 412. During this drain sequence all valves are automatically closed except the drain valves. When the contents of the filter chamber 410 have been drained, the drain valves are closed and air injected through a suitable valve, not shown. The filter outlet valve 501 is opened to allow air or gas to pressurize the filter chamber 410. The air drives any liquid entrapped within the filter cake out through the filter cake into the filter tube 462 thereby drying the filter cake material to obtain additional filtrate product recovery and to maximize the filter cake dryness prior to removal from the filter septum 468 and discharged from the filter chamber 410.

When the contents of the filter chamber 410 have been drained and the pressurized air has driven the residual liquid through the filter cake, the filter cake is compressed on the septum 468, dried and ready to be removed from the filter chamber 410. The filter drive motor 465 is energized rotating the filter tube 462 and the filter elements 460 against the stationary brush or wipers 480. Rotation of the filter elements 460 against the wipers 480 causes the expended filter cake and accumulants to be removed from the filter septum and dropped downwardly into the trough 412 whereat the rotating auger 413 will convey these materials from the filter chamber 410 into a sludge reservoir or container 500.

In order to assure complete discharge of the filter cake and accumulants and to avoid any buildup in the transition area between the cylinderical filter chamber 410 and the trough portion 412, vibratory side plates 445 are supported from a portion of the filter chamber 410. Any materials that are removed from the filter septum 468 will fall onto the vibratory side plates 445 which, through a vibratory action, will convey the material downwardly into the trough 412 for removal by the auger 413. The expended filter cake material and accumulants are then conveyed outwardly by the auger 413 from the filter chamber 410 through the pneumatically controlled butterfly valve 417 for passage into the sludge reservoir 500. For further details concerning a suitable vertical leaf filter reference is had to K. S. Arvanitakis, application Ser. No. 809,199, "VERTICAL FILTER SYSTEM", for the details thereof the disclosure of which is incorporated herein by reference.

When the solids material have all been discharged from the filter chamber 410 the butterfly valve 417 is closed and the discharge pump 351 of the sludge dilution reservoir 300 is again activated and starts to refill the filter chamber 410 with liquid discharged through inlet 401 against turbulence suppressor plate 408. During the refilling operation the air vents 492 are open to bleed air preventing any air buildup in the filter chamber. When the filter chamber 410 is completely filled with liquid, the discharge pump 351 stops and the air vents 492 are closed. The filter drive motor 465 is again energized rotating the filter elements 460 against the wipers 480 while the filter chamber 410 is filled with liquid to scrub the septum 468 completely clean. The filter is then ready to receive a new cake on the filter elements.

The expended filter cake has been passed into the sludge container reservoir 500. The sludge container reservoir 500 is sized of a sufficient capacity to hold all of the sludge removed from the filter elements 460 so that the filter chamber 410 may be entirely cleaned to receive a new precoat on the filter septum 468 to continue operation. The reservoir is formed as a closed container with a motor driven scraper 510 carried within for passing the solids material or sludge through an opening 511 formed in the bottom of the chamber. The sludge material is fed through the opening 511 in the bottom thereof by means of the slowly rotating scraper 510 into a variable speed horizontal auger conveyor 515 which is energized to forward the sludge into an inlet 601 of the sludge drying apparatus 600 at a rate of speed determined by the nature of the sludge material.

The sludge drying apparatus 600 (shown in FIGS. 1 and 9) comprises a plurality of heat transfer conveying units 650 which function to expose the sludge to heating surfaces thereby evaporating liquid as the sludge is conveyed through the heating stations in the direction indicated by the arrows. Each heat transfer conveying unit 650 includes a cylinder 651, into which the sludge is passed, having a steam jacket 652 surrounding the cylinder 651 substantially throughout its entire length such that the inner surface of the cylinder 651 is elevated to a temperature above the boiling or evaporation point of the liquid in the sludge passed thereinto. While the embodiment shown utilizes a steam jacket for effecting the heating of the cylinder 651, it is to be understood that hot oil or an electrically heated jacket may be utilized for this function as well as any other means for heating the interior of the surface of the cylinder 651 to the desired temperature.

The sludge entering the uppermost heat transfer unit 650 through the inlet 601 is advanced by this unit while being exposed to heat, and passes downward from the opposite end thereof as indicated by the direction of the arrow. Each heat transfer conveyor unit 650 has an auger 654 rotatably journalled in suitable end caps which enclose the two ends of the cylinder forming a water and vapor tight closure. As best shown in FIG. 10, a portion of each auger flight may be removed (655) and a resilient metal strip 666, suitably secured to the auger shaft 656, extends between adjacent flights of the auger. The metal or resilient strip 666 extends outwardly from the auger shaft 656 to a position adjacent but not in contact with the inner surface of the cylinder 651. A blade 667 formed of or coated with a tetrafluoroethylene polymer or similar material is secured to the support strip 666 and extends therefrom into wiping contact with the interior surface of the cylinder 651. While the auger 654 functions to convey materials in the direction indicated by the arrows, the resilient support strip 666 bearing the polymeric blade 667 in contact with the inner wall of the cylinder 651 functions to spread or squeegee the sludge throughout the entire inner surface of the heated cylinder 651. The blade 667, biased by the resilient support strip 666 applies the sludge to the entire inner surface of the cylinder 651 during rotation of the auger 656 thereby increasing the thermal contact area of the sludge with the heated surface to increase the distillation or evaporation efficiency. In addition, since the sludge is applied in a thin film to the inner surface of the cylinder, the evaporation occurs at a greater rate resulting in increased solids accumulation along the inner periphery of the cylinder 651.

While the rotation of the auger 654 applies the sludge to the inner surface of the heated cylinder 651, the action of the resilient support 666 biasing the polymeric blade 667 into contact with the inner surface walls of the heated cylinder 651 scrapes or removes the dried sludge from the inner surface at that point, thereby preventing a buildup of the solids material which would decrease heat transfer efficiency. As the dried sludge is scraped or removed from the inner surface of the heated cylinder, it is returned to the remaining sludge to facilitate the transfer of the material through the system.

As best shown in FIG. 9, at a point roughly midway on each auger shaft 656 one embodiment of the sludge dryer may use a series of smaller augers 653 which serve to maintain certain amounts of sludge or a sludge "dam" in the area defined by the smaller auger. This dam traps sludge behind it and prevents liquid from freely circulating through the system. The sludge buildup caused by these smaller augers 653 also restricts the freedom of movement of the less viscous sludge, thereby increasing the solids content of the sludge on each successive conveyor unit 650. Continuous movement of the sludge material is assured since the larger augers 654 will add a certain amount of sludge at the inlet end of the buildup, while slicing off an equal amount at the opposite end. In addition, the smaller augers 653 prevent a sludge plug from forming to block the cylinder to thereby allow free passage of the vapors evolved from the sludge throughout the system. The action of the smaller augers 653 in maintaining a cleared area in the rotation is illustrated in FIG. 11.

As the sludge is advanced through each heat transfer conveyor unit 650 it reaches the end opposite to the inlet and is directed from the first heat transfer conveyor unit through an outlet 612 which functions as an inlet to the next heat transfer conveyor unit 650. When the sludge reaches the terminal end of a heat transfer conveyor, a deflector guide 657, secured to one end of the auger shaft 656 directs the sludge out from the column through the discharge outlet 612 into the next heat transfer conveyor unit 650. The structure of each of the heat transfer conveyor units 650 is the same as that previously described and, therefore, like reference numerals indicate like parts.

As the sludge is advanced from one heat transfer conveyor unit 650 to the next heat transfer conveyor unit 650, the dryness of the sludge increases due to the evaporation of the liquid and the continuous scraping of the dried sludge from the heated surface. This sequential advancing of the sludge in thermal contact with the heated surface of the conveyor unit 650 eventually removes the liquid from the sludge resulting in the discharge of dry or semi-dry solids from the outlet 615 of the last heat transfer conveyor 650a. The progressive removal of the liquid from the sludge as the mixture advances through the conveying units 650, changes the consistency of the sludge such that the deflectors 657 carried at the terminal end of each auger shaft 656 must sometimes be strengthened to force the sludge into the subsequent conveying unit. The forcing of the materials by the deflectors 657 squeezes the sludge which facilitates removal of the liquid therefrom to more efficiently obtain a dry waste discharge.

Rotational power for each of the conveyor units 650 is provided by a drive motor MOT-1 coupled to a portion of the auger shafts 656 which extend without the housing 610 with each having a suitable drive gear 658 secured thereto and operatively connected to the drive motor by means of a flexible drive system such as chains 659.

An exhaust manifold 607 is carried by the frame 604 adjacent the housing 610 and is connected to alternate cylinders 651 of the heat transfer conveyors 650 by means of exhaust ducts 608 for withdrawing vapors formed during operation of the heat transfer conveyors 650. As the vapors created by evaporating the liquid from the sludge pass out of the manifold 607, they are vented to the atmosphere or burned by passing through an exhaust gas burner 625. A blower (not shown) may be connected to the exhaust manifold to draw the vapors from the cylinders 651. For further details of such a sludge dryer reference is had to K. S. Arvanitakis, U.S. Pat. No. 3,997,406, "EVAPORATOR APPARATUS AND PROCESS", which is incorporated herein by reference.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A liquid clarification system for clarifying liquid bearing solid and/or chemical contaminant materials comprising
storage means for retaining in a quiescent state a quantity of unclarified liquid bearing suspended contaminant materials to effect a gravitational separation of at least a portion of the suspended contaminant materials from the unclarified liquid,
means for withdrawing the portion of unclarified liquid bearing the gravitationally separated contaminants into a storage reservoir,
a storage reservoir for retaining unclarified liquid bearing the gravitationally separated contaminants, means for controlling the percentage of contaminants in said unclarified liquid and means for discharging said unclarified liquid and contaminants at a controlled discharge output,
filtration means operatively connected to said storage reservoir for receiving said controlled discharge of contaminant bearing liquid,
said filtration means including filter means for removing the suspended contaminants from the unclarified liquid and discharging the liquid clarified thereby, and
means for conveying the discharge of clarified liquid from said filtration means to said storage reservoir for controlling the discharge output of the unclarified liquid and contaminants in said storage reservoir.

2. The apparatus of claim 1 further including means for removing the suspended contaminants from said filter means and drying said contaminants so removed.

3. The apparatus of claim 2 wherein said means for removing and drying said suspended contaminants removed by said filter means comprises a plurality of heated auger conveyors.

4. The apparatus of claim 1 further including means for adding a quantity of filter cake forming materials to said unclarified liquid retained in said storage reservoir for forming a filter cake on said filter means.

5. The apparatus of claim 1 wherein said storage means for retaining a quantity of unclarified liquid bearing suspended contaminant materials to effect a gravitational separation of at least a portion of the suspended contaminants for the unclarified liquid comprises a clarifier having a plurality of frusto-conic sections for gravitationally separating suspended contaminants from the unclarified liquid.

6. A method of clarifying liquids bearing solid and/or chemical contaminant materials comprising the steps of
retaining a quantity of unclarified liquid bearing suspended contaminant materials in a quiescent state and gravitationally separating at least a portion of the suspended contaminants from the unclarified liquid,
withdrawing at least that portion of the unclarified liquid bearing the gravitationally separated suspended contaminants,
retaining that portion of the unclarified liquid bearing the gravitationally separated suspended contaminants, controlling the percentage of suspended contaminants in said unclarified liquid, and discharging said unclarified liquid and contaminants at a controlled discharge output,
filtering said controlled discharge output of unclarified liquid and contaminants removing the suspended contaminants from the unclarified liquid, and
discharging the liquid clarified by filtering into the retained unclarified liquid bearing the gravitationally separated suspended contaminants to control the discharge output prior to the filtering thereof.

7. The method of claim 6 further including the step of drying the suspended contaminant removed from the unclarified liquid by filtering.

8. The method of claim 6 further including the step of adding a quantity of filter cake forming materials to the retained unclarified liquid bearing the gravitationally separated suspended contaminants to form a filter cake therewith for filtering said controlled discharge output of unclarified liquid and contaminants.

9. The method of claim 8 wherein the step of adding a quantity of filter cake forming materials to the retained unclarified liquid bearing the gravitationally separated suspended contaminants occurs during filtering of said controlled discharge output of unclarified liquid and contaminants.

10. The method of claim 6 wherein said withdrawing at least that portion of the unclarified liquid bearing the gravitationally separated suspended contaminants occurs in response to the filtering of said controlled discharge output of unclarified liquid and contaminants.

* * * * *